United States Patent
Järvenkylä

[11] Patent Number: 5,449,487
[45] Date of Patent: Sep. 12, 1995

[54] METHOD AND APPARATUS FOR ORIENTING PLASTIC OF A PIPE

[75] Inventor: Jyri Järvenkylä, Salpakangas, Finland

[73] Assignee: Uponor N.V., Philipsburg, Netherlands

[21] Appl. No.: 28,239

[22] Filed: Mar. 9, 1993

[30] Foreign Application Priority Data

Mar. 30, 1992 [FI] Finland ................. 921394

[51] Int. Cl.⁶ ............................................ B29C 47/20
[52] U.S. Cl. ...................... 264/508; 264/209.5;
425/325; 425/326.1; 425/380; 425/393
[58] Field of Search ............... 264/209.4, 209.5, 508;
425/325, 326.1, 380, 393

[56] References Cited

U.S. PATENT DOCUMENTS

| | | | |
|---|---|---|---|
| 2,708,772 | 5/1955 | Moncrieff | 264/209.4 |
| 3,320,637 | 5/1967 | Van Dijk | 264/209.4 |
| 4,093,412 | 6/1976 | Davis et al. | 425/71 |
| 4,663,107 | 5/1987 | Takada et al. | 264/209.4 |
| 4,721,594 | 1/1988 | Järvenkylä | 264/508 |
| 4,867,928 | 9/1989 | Järvenkylä et al. | 264/508 |
| 5,023,029 | 6/1991 | Lupke | 264/508 |
| 5,096,634 | 3/1992 | Tsadares et al. | 264/209.5 |
| 5,139,730 | 8/1992 | Hölsö et al. | 264/209.4 |
| 5,186,878 | 2/1993 | Lupke | 264/209.4 |
| 5,290,498 | 3/1994 | Shiraki et al. | 264/209.5 |

FOREIGN PATENT DOCUMENTS

| | | |
|---|---|---|
| 70387 | 3/1986 | Finland . |
| 2357210 | 6/1974 | Germany . |
| 9106417 | 5/1991 | WIPO . |

*Primary Examiner*—Catherine Timm
*Attorney, Agent, or Firm*—Ladas & Parry

[57] ABSTRACT

A method and an apparatus for the orientation of a plastic pipe, wherein a pipe blank (2) is produced with an extruder and fed into a pipe forming apparatus provided with movable moulds (3), such as a corrugator, the pipe being conveyed forward in the corrugator with said moulds over a mandrel (4), along which the pipe is further conveyed out from the corrugator. In accordance with the invention, the plastic pipe (7) is oriented radially immediately after the corrugator by means of a conically widening mandrel (5) forming an extension of said corrugator. The invention also relates to an oriented ribbed plastic pipe produced by the method.

24 Claims, 1 Drawing Sheet

5,449,487

METHOD AND APPARATUS FOR ORIENTING PLASTIC OF A PIPE

BACKGROUND OF THE INVENTION

The present invention relates to a method and an apparatus for the orientation of a plastic pipe, wherein a pipe blank is produced with an extruder and fed into a pipe forming apparatus provided with movable moulds, such as a corrugator, the pipe being conveyed forward in the corrugator with said moulds over a mandrel, along which the pipe is further conveyed out from the corrugator, and an oriented ribbed plastic pipe produced by the method.

The orientation of plastic articles means enhancing the strength of said articles in a certain direction by orienting the molecules in the plastic material in said direction, whereby the tensile strength of the plastic increases and the stretch decreases in said direction. Applied to tubular articles, orienting is effected in the radial direction (radial orientation), whereby for instance the pressure resistance of the pipe increases, or in the longitudinal direction of the pipe (axial orientation), whereby for instance the tensile strength of the pipe increases, or in both directions (biaxial orientation).

The production of unoriented corrugated plastic pipes or ribbed pipes is well known technology, cf. for instance Finnish Patents 60825, 74654 and 77405. Improving the properties of ribbed pipes by orientation is also known, cf. for instance the publication WO 90/02648. The orientation technique of normal plastic pipes has been disclosed for instance in the publication DE 2357210 (Petzetakis).

In the known methods and apparatuses for producing plastic pipe wherein a corrugator is used the molten tubular blank extruded from the die is moulded and cooled by means of movable moulds (cast moulds). Since the plastic material must be made to set rapidly, an interior mandrel is often used to aid the cooling. With a moving chain of moulds, highly efficient heat transfer is achieved. Typically, in the production PVC pipes, for instance, the temperature of the material is 200° C. at the feeding step, and is cooled by means of moulds to about 50° C. In the radial orientation of conventional pipes, the material is forced onto a conically widening second mandrel, and thus the wall of the tube is stretched and the plastic molecules are oriented in the radial direction and possibly also axially (biaxial orientation). Depending on the conditions, biaxial orientation can also be effected in different directions separately in two or more steps.

The known orientation techniques are characterized in that the pipe is cooled on the outside with a purpose of providing for the pipe as rapid cooling down to the orientation temperature as possible. Thereafter the pipe is conveyed for instance with a drawing apparatus further to the next processing step, for instance to an orientation station, at which the orientation is performed. The orientation temperature is advantageously about 10°-30° C. higher than the glass transition temperature of the plastic. What is important is that the temperature gradient in the pipe wall is uniform.

When a pipe in this state is oriented by drawing it over a widening mandrel portion, high friction forces are generated between the mandrel and the plastic pipe. On the other hand, in the known apparatuses the soft pipe would not withstand drawing over the mandrel without lubrication (cf. DE 2357210). In the known plastic pipe manufacturing lines, the cooling and transport of the pipes is carried out with separate equipment, in which situation considerable attention must be paid to the heat treatment and mechanical strength of the pipe.

OBJECT OF THE INVENTION

The object of this invention is to achieve a method and an apparatus for the orientation of a plastic pipe, wherein the drawbacks of the known solutions are obviated. For achieving this, the method and apparatus of the invention are characterized in that the plastic pipe is oriented radially immediately after the corrugator by means of a conically widening mandrel forming an extension of said corrugator. The method of the invention can employ a shorter corrugator or more moderate cooling than the production of conventional corrugated pipes. For instance with PVC, the orientation temperature is in the range 90°-110° C. Bringing the pipe wall uniformly to this temperature in the corrugator presupposes the production of relatively thin-walled pipes, on account of which precisely ribbed pipes are particularly well suited for orientation by the method of the invention. Also, one idea of the invention is that since there is a rather tight pressure between the moulds and the plastic in the corrugator, and since on the other hand the moulds do not slide at all relative to the plastic, the carrying out of the orientation with a widening mandrel immediately after the corrugator, and even partly within it, is the most advantageous production step in which this can be effected. Within the corrugator, the widening mandrel could compensate, for instance, only the shrinkage of the plastic that takes place during cooling, while the actual orientation takes place outside the corrugator.

The other advantageous embodiments of the invention and the apparatus are characterized in that which is set forth in the ensuing claims.

BRIEF DESCRIPTION OF THE DRAWINGS

The invention will be explained in more detail in the following by means of an example with reference to the accompanying drawings, which show the apparatus of the invention in a cross-sectional view.

DETAILED DESCRIPTION OF PREFERRED EMBODIMENTS

Figure 1:
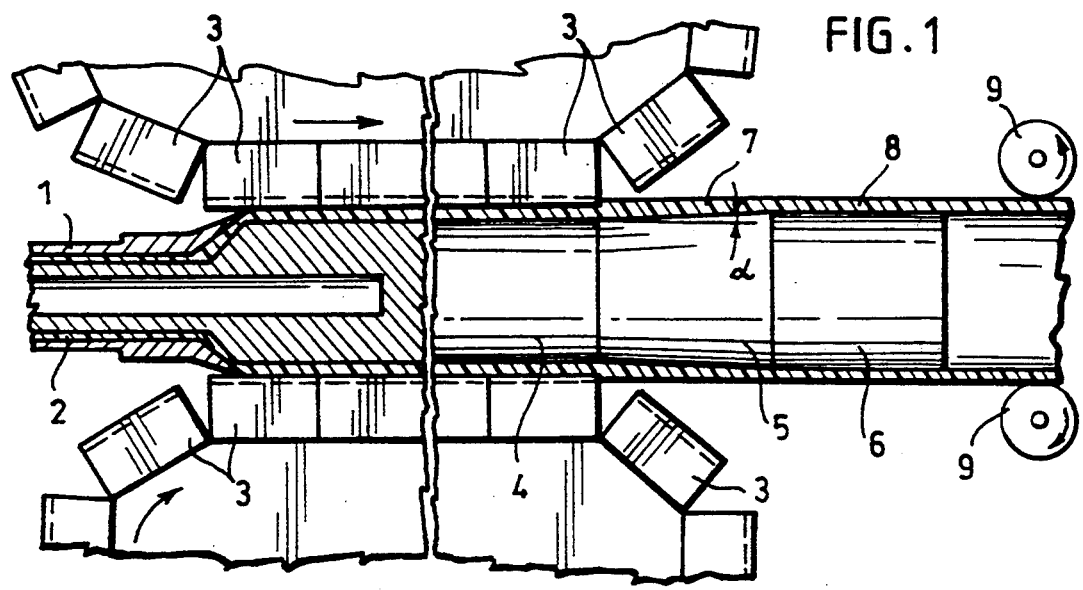
FIG. 1 shows the end of a pipe line producing corrugated or similar pipe, whereto the presently involved invention is implemented.

In FIG. 1, the die of an extruder forming a pipe blank is denoted by reference numeral 1. The plastic material 2, which is in a molten state at this stage, is forced by pressure along the die into a corrugator known per se, which has moulds 3 movable in an endless-chain fashion in the direction of the arrows. The initial pipe forming is effected between the mandrel 4 within the corrugator and the moulds 3 in such a way that the exterior surface of the plastic pipe is formed by means of an upper and lower mould 3 into the desired shape, for instance to have ribs. However, from the point of view of the invention it is inessential what outer shape the moulds have been fashioned to impart to the pipe; the shape can even be smooth without departing from the invention. The main thing is that the moving moulds of the corrugator convey the pipe forward. The pipe cooling employed in conventional corrugators is made use of as little as possible, or not at all.

Figure 3:
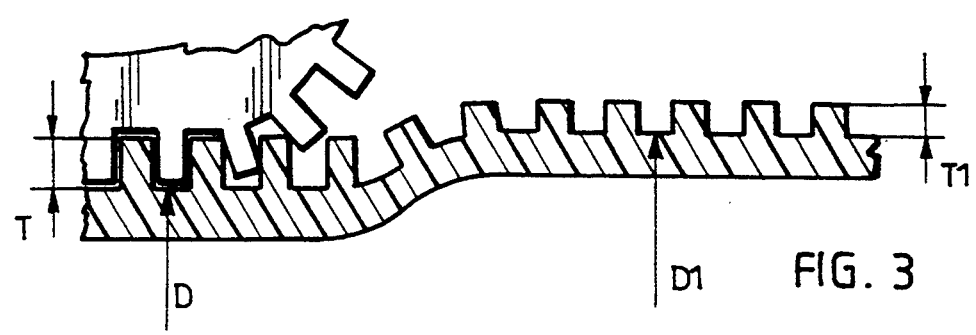
FIG. 3 shows the dimensions of oriented and unoriented pipes and their ribs.

The plastic pipe slides within the corrugator along the mandrel 4, which continues outside the corrugator as a portion 5 conically widening at a coning angle α, in which portion the orientation of the plastic pipe 7 is effected while the pipe is still soft after the initial forming. The diameter of the widening mandrel is for instance 1.1 to 1.5 times the diameter of a pipe produced with the corrugator as such, advantageously 1.6 times said diameter. The ratio D1/T1 between the diameter of the oriented pipe and the height of its rib will be higher than the corresponding ratio D/T (FIG. 3) in an unexpanded pipe issuing from the corrugator.

As there is no friction between the moulds 3 and the pipe located in the corrugator, but the moulds move together with the pipe pushing it forward, it is found that the combination of moulds, a widening mandrel, and a substantially uncooled pipe will produce orientation of the molecules in the plastic pipe; for this purpose, separate equipment taking up a lot of space, such as cooling equipment, drawing apparatus, etc., has previously been needed.

In accordance with the invention, orientation is achieved by suitably forming the mandrel so that the pipe issuing from the corrugator is oriented at least radially as it arrives at the conical portion 5 of the mandrel. The coning angle α and the length of the conical portion 5 of the mandrel can vary in accordance with the conditions and the desired final result. The main thing is that the conical portion 5 starts immediately after the corrugator, advantageously at the point where the moulds 3 that opposed one another are detached from the pipe and separate, either as a direct extension of the mandrel 4 or as a separate mandrel attached thereto. Also axial orientation in the molecular structure of the pipe is possible to produce simultaneously, if the pipe is drawn at a higher speed than that at which it issues from the corrugator. In that situation, the pipe will automatically be oriented biaxially, which is advantageous in view of the durability of the pipe. At any rate, a pipe drawing apparatus 9 is necessary for the after-treatment of the pipe, and the regulation of its drawing speed so as to produce or not to produce axial orientation in the pipe is obvious to one skilled in the art.

The mandrel portion 6 can, if necessary, be cooled at the pipe section 8 at which a pipe of nominal dimensions is conveyed forward to be finished, to produce a sufficiently smooth inner surface.

Figure 2:
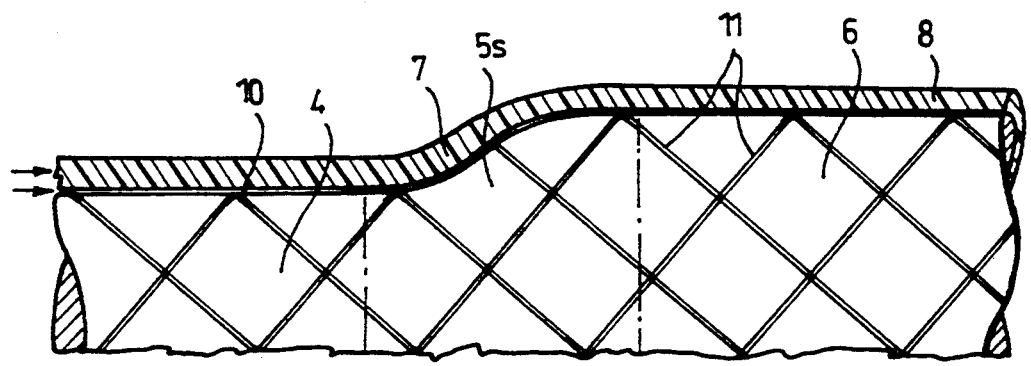
FIG. 2 is a partial enlarged view of one embodiment of a mandrel of the invention.

The maintaining of a tight contact between the moulds and the plastic pipe, and thereby also the radial expansion of the pipe, can be enhanced or secured by pumping within the corrugator a fluid 10, such as water, between the mandrel and the plastic pipe, as shown in FIG. 2. Thus the liquid layer 10 and the plastic pipe 7 have the same direction of movement indicated by the arrows. By means of such hydraulic pressure, the pipe can be tightly pressed against the cooling moulds, and on the other hand a lubricating effect between the pipe and the mandrel is achieved. Advantageously, the pressure of the liquid is such that it will only just produce expansion of the pipe in the region of the mandrel without the lubricating film 10 being broken and, on the other hand, without the film being forced out from between the mandrel and the pipe. In that case, actually radial orientation and expansion of the plastic pipe is produced by means of hydraulic pressure between the pipe and the mandrel. E.g. ducts provided in the mandrel 4 of the corrugator and a pump (not drawn) feeding them with liquid are needed to produce the liquid film 10. The point of feeding in of the liquid upon the surface of the mandrel 4 is dependent on the conditions; when water is used one must beware of exceeding its boiling point.

Advantageously, the surfaces of the widening mandrel 5s and the calibrating mandrel 6 following it are grooved. Preferably the cross-section of at least the grooves 11 provided in the calibrating mandrel 6 decreases in the forward direction. In that event, as the liquid of the liquid layer 10 flows along the mandrel 5s and 6, the pressure loss of the liquid increases in the direction of travel of the plastic pipe on account of the grooves 11. Thus the liquid layer between the plastic pipe 8 and the mandrel 6 will gradually dissipate, until at the end of mandrel 6 the plastic pipe 8 is in close contact with the mandrel and receives therefrom its finished, smooth inner surface.

In the shaping of the mandrel, the grade of the plastic, the production speed, the temperature, and naturally also the degree of orientation desired have to be taken into account. A "natural shape" for the widened neck portion can be determined for each pipe grade either mathematically or empirically, said natural shape being such as to minimize friction and thereby to ensure the continuity of the lubricating liquid layer upon the mandrel. One typical suitable shape for the mandrel at the widening portion 5s is a gently sloping S in accordance with FIG. 2, which corresponds for instance to the shape obtained by a plastic film in a blow forming process in connection with free blowing. In such a situation, the danger of breakage of the liquid layer 10 has been shown to be at its smallest.

It is evident to one skilled in the art that the different embodiments of the invention are not restricted to the example set forth above, but they can vary within the scope of the ensuing claims.

I claim:

1. A method of forming an oriented plastic pipe, the method comprising the steps of:
   producing a pipe blank (2) with an extruder;
   feeding the pipe blank in a longitudinal direction into moulds (3) moving along a portion of a path of a pipe forming apparatus, the portion of the path lying in the longitudinal direction;
   first forwarding the moulds and pipe blank in the pipe forming apparatus in the longitudinal direction until the moulds and pipe blank are over a first mandrel (4) of the pipe forming apparatus for converting the pipe blank into plastic pipe (7);
   second forwarding the plastic pipe in the longitudinal direction until the plastic pipe is over a second, conically widening mandrel (5; 5s) forming an extension of the pipe forming apparatus starting from a point at which the moulds (3) of the pipe forming apparatus depart from the portion of the path lying in the longitudinal direction; and
   radially orienting the plastic pipe over the conically widening mandrel.

2. A method according to claim 1, and further comprising expanding a diameter of the plastic pipe (7) 1.1-fold to 5-fold over the conically widening mandrel.

3. A method according to claim 1, wherein the plastic pipe (7) is also oriented axially at the conically widening mandrel (5; 5s) by drawing the plastic pipe out of the pipe forming apparatus in the longitudinal direction at a speed higher that at least the second forwarding of the plastic pipe.

4. A method according to claim 2, wherein the plastic pipe (7) is also oriented axially at the conically widening mandrel (5; 5s) by drawing the plastic pipe out of the pipe forming apparatus in the longitudinal direction at a speed higher that at least the second forwarding of the plastic pipe.

5. A method according to claim 1, wherein, during the radial orienting, a liquid layer (10) is provided between the plastic pipe and the conically widening mandrel (5; 5s) by hydraulic pressure.

6. A method according to claim 2, wherein, during the radial orienting and expanding, a liquid layer (10) is provided between the plastic pipe and the conically widening mandrel (5; 5s) by hydraulic pressure.

7. A method according to claim 3, wherein, during the radial orienting, a liquid layer (10) is provided between the plastic pipe and the conically widening mandrel (5; 5s) by hydraulic pressure.

8. A method according to claim 4, wherein, during the radial orienting and expanding, a liquid layer (10) is provided between the plastic pipe and the conically widening mandrel (5; 5s) by hydraulic pressure.

9. A method according to claim 5, wherein a conical surface of the conically widening mandrel (5; 5s) and a surface of a third, calibrating mandrel (6) of the pipe forming apparatus disposed in the longitudinal direction after the conically widening mandrel are grooved (11), and further comprising flowing a liquid of the liquid layer (10) along the surface of the conically widening mandrel (5; 5s, 6) so that pressure loss in the grooves (11) increases in the longitudinal direction to bring a section (8) of the plastic pipe (7) at a final end of the calibrating mandrel into close contact with the calibrating mandrel.

10. A method according to claim 6, wherein a conical surface of the conically widening mandrel (5; 5s) and a surface of a third, calibrating mandrel (6) of the pipe forming apparatus disposed in the longitudinal direction after the conically widening mandrel are grooved (11), and further comprising flowing a liquid of the liquid layer (10) along the surface of the conically widening mandrel (5; 5s, 6) so that pressure loss in the grooves (11) increases in the longitudinal direction to bring a section (8) of the plastic pipe (7) at a final end of the calibrating mandrel into close contact with the calibrating mandrel.

11. A method according to claim 7, wherein a conical surface of the conically widening mandrel (5; 5s) and a surface of a third, calibrating mandrel (6) of the pipe forming apparatus disposed in the longitudinal direction after the conically widening mandrel are grooved (11), and further comprising flowing a liquid of the liquid layer (10) along the surface of the conically widening mandrel (5; 5s, 6) so that pressure loss in the grooves (11) increases in the longitudinal direction to bring a section (8) of the plastic pipe (7) at a final end of the calibrating mandrel into close contact with the calibrating mandrel.

12. A method according to claim 8, wherein a conical surface of the conically widening mandrel (5; 5s) and a surface of a third, calibrating mandrel (6) of the pipe forming apparatus disposed in the longitudinal direction after the conically widening mandrel are grooved (11), and further comprising flowing a liquid of the liquid layer (10) along the surface of the conically widening mandrel (5; 5s, 6) so that pressure loss in the grooves (11) increases in the longitudinal direction to bring a section (8) of the plastic pipe (7) at a final end of the calibrating mandrel into close contact with the calibrating mandrel.

13. An apparatus for forming an oriented plastic pipe, said apparatus comprising:

a pipe forming apparatus having a first mandrel for receiving a pipe blank (2) in a longitudinal direction from an extruder; and moulds (3) in the pipe forming apparatus and movable along a portion of a path in the longitudinal direction for movement of the moulds to forward the pipe blank in the pipe forming apparatus over the first mandrel (4) in order to produce a plastic pipe (7);

the first mandrel (4) extending in the longitudinal direction out from the pipe forming apparatus to a conically widening portion (5; 5s) starting from a point at which the moulds (3) depart from the portion of the path in the longitudinal direction for radially orienting the plastic pipe (7).

14. An apparatus according to claim 13, and further comprising drawings means (9) for drawing the plastic pipe from the pipe forming apparatus in the longitudinal direction at a speed adjustable and orienting the plastic pipe axially over the conically widening portion of the first mandrel.

15. An apparatus according to claim 13, and further comprising pressure means for producing a liquid layer (10) between the plastic pipe (7) and the conically widening portion (5) of the first mandrel (4) by hydraulic pressure.

16. An apparatus according to claim 14, and further comprising pressure means for producing a liquid layer (10) between the plastic pipe (7) and the conically widening portion (5) of the first mandrel (4) by hydraulic pressure.

17. An apparatus according to claim 13, wherein a surface at the conically widening portion of the first mandrel has the shape of a gently sloping S.

18. An apparatus according to claim 16, wherein a surface at the conically widening portion of the first mandrel has the shape of a gently sloping S.

19. An apparatus according to claim 13, wherein a final diameter of the conically widening portion (5; 5s) of the first mandrel in the longitudinal direction is 1.1-fold to 5-fold of an initial diameter thereof.

20. An apparatus according to claim 18, wherein a final diameter of the conically widening portion (5; 5s) of the first mandrel in the longitudinal direction is 1.1-fold to 5-fold of an initial diameter thereof.

21. An apparatus according to claim 15, wherein a conical surface of the conically widening portion (5; 5s) of the first mandrel and a surface of a calibrating mandrel (6) disposed in the longitudinal direction after the first mandrel have grooves (11) for liquid of the liquid layer (1) to flow along the first and calibrating mandrels (5; 5s, 6) with increasing pressure loss in the longitudinal direction.

22. An apparatus according to claim 20, wherein a conical surface of the conically widening portion (5; 5s) of the first mandrel and a surface of a calibrating mandrel (6) disposed in the longitudinal direction after the first mandrel have grooves (11) for liquid of the liquid layer (1) to flow along the first and calibrating mandrels (5; 5s, 6) with increasing pressure loss in the longitudinal direction.

23. An apparatus according claim 21, wherein cross sections of at least the grooves (11) of the calibrating mandrel (6) decrease in the longitudinal direction.

24. An apparatus according claim 22, wherein cross sections of at least the grooves (11) of the calibrating mandrel (6) decrease in the longitudinal direction.

* * * * *